US 10,550,765 B2

(12) United States Patent
Ortmann et al.

(10) Patent No.: US 10,550,765 B2
(45) Date of Patent: Feb. 4, 2020

(54) ENERGY STORAGE DEVICE AND METHOD FOR STORING ENERGY

(71) Applicants: Peter Ortmann, Schaffhausen (CH); Werner Graf, Schaffhausen (CH)

(72) Inventors: Peter Ortmann, Schaffhausen (CH); Werner Graf, Schaffhausen (CH)

(*) Notice: Subject to any disclaimer, the term of this patent is extended or adjusted under 35 U.S.C. 154(b) by 0 days.

(21) Appl. No.: 16/345,315

(22) PCT Filed: Oct. 26, 2017

(86) PCT No.: PCT/EP2017/077533
§ 371 (c)(1),
(2) Date: Apr. 26, 2019

(87) PCT Pub. No.: WO2018/078062
PCT Pub. Date: May 3, 2018

(65) Prior Publication Data
US 2019/0277196 A1 Sep. 12, 2019

(30) Foreign Application Priority Data
Oct. 26, 2016 (EP) .................................... 16195878

(51) Int. Cl.
F01K 3/00 (2006.01)
F02C 6/14 (2006.01)
(Continued)

(52) U.S. Cl.
CPC ................ F02C 6/14 (2013.01); F01K 3/006 (2013.01); F01K 25/00 (2013.01); F02C 1/04 (2013.01); F28D 17/00 (2013.01)

(58) Field of Classification Search
CPC .......... F01K 3/006; F01K 25/005; F01K 3/12; F01K 3/06; F01K 25/00
See application file for complete search history.

(56) References Cited

U.S. PATENT DOCUMENTS 5,269,145 A * 12/1993 Krause .................. C09K 5/063
60/659
8,627,665 B2 1/2014 Ruer
(Continued)

FOREIGN PATENT DOCUMENTS

DE 102011088380 A1 6/2013
DE 102013217607 A1 3/2015
(Continued)

OTHER PUBLICATIONS

Translation PCT/EP2017/077533 International Search Report, dated Mar. 14, 2018, 3 pages.

Primary Examiner — Mark A Laurenzi
Assistant Examiner — Shafiq Mian
(74) Attorney, Agent, or Firm — Brooks Kushman P.C.

(57) ABSTRACT

An energy storage device having: a high-temperature regenerator containing a solid, particularly porous storage material (S); a working gas (A) as the heat transfer medium to transfer heat between the storage material (S) and the working gas (A) flowing through; and a charging circuit and a discharging circuit for the working gas (A). The charging circuit is designed such that starting from a pre-heating unit at least one first heat transfer duct of a recuperator, a first compressor (H0), the high-temperature regenerator, a second heat transfer duct of the recuperator and then a first expander are interconnected, thus forming a circuit, so as to conduct fluid. The first compressor is coupled with the first expander, and the first compressor forms part of a first piston machine (K1) and the first expander forms part of a second piston machine (K2), the piston machines (K1, K2) being operable either as a compressor or as an expander such that the first compressor of the charging circuit forms a second expander in the discharging circuit and that the first expander of the charging circuit forms a second compressor in the discharging circuit. The high-temperature regenerator (Continued)

Figure 1:
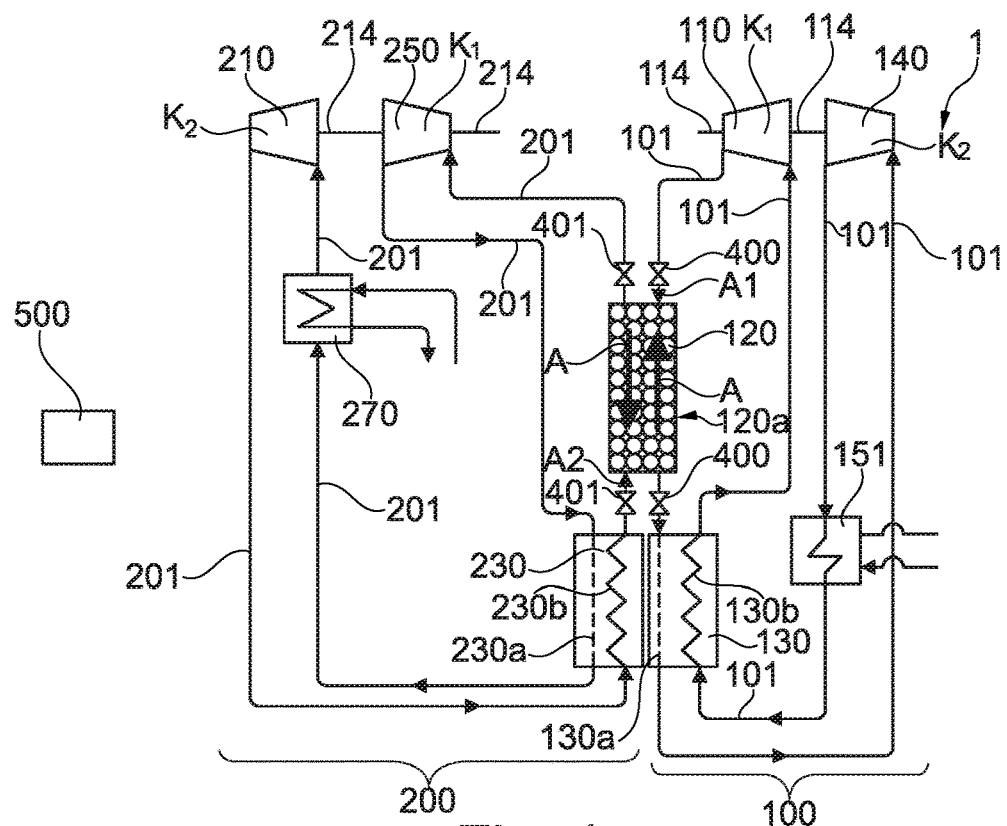

can be connected to either the charging circuit or the discharging circuit to conduct fluid and can be controlled such that the high-temperature regenerator, the compressor and the expander form either part of the charging circuit or part of the discharging circuit. The charging circuit, the discharging circuit and the high-temperature regenerator have the same working gas (A) so that the working gas (A) comes into direct contact with the storage material of the high-temperature regenerator both in the charging circuit and in the discharging circuit.

18 Claims, 9 Drawing Sheets

(51) Int. Cl.
*F28D 17/00* (2006.01)
*F02C 1/04* (2006.01)
*F01K 25/00* (2006.01)

(56) References Cited

U.S. PATENT DOCUMENTS

| | | | |
|---|---|---|---|
| 9,187,325 B2* | 11/2015 | Turner | B01J 10/002 60/159 |
| 9,518,786 B2* | 12/2016 | Howes | F01K 3/12 60/659 |
| 2014/0008033 A1* | 1/2014 | Howes | F28D 20/0056 165/10 |
| 2014/0224447 A1* | 8/2014 | Reznik | F28D 20/0056 165/10 |
| 2014/0338330 A1 | 11/2014 | Brunhuber et al. | |
| 2016/0248299 A1* | 8/2016 | Ouvry | F01K 3/12 60/659 |

FOREIGN PATENT DOCUMENTS

| | | | |
|---|---|---|---|
| EP | 2147193 B1 | 10/2013 | |
| WO | 2016169928 A1 | 10/2016 | |
| WO | 2017081186 A1 | 5/2017 | |

\* cited by examiner

ENERGY STORAGE DEVICE AND METHOD FOR STORING ENERGY

CROSS-REFERENCE TO RELATED APPLICATION

This application is the U.S. national phase of PCT Application No. PCT/EP2017/077533filed on Oct. 26, 2017, which claims priority to EP Patent Application No. 16195878.0 filed on Oct. 26, 2016, the disclosures of which are incorporated in their entirety by reference herein.

DESCRIPTION

The invention concerns an energy storage device for storing energy. The invention also concerns a method for storing energy.

STATE OF THE ART

Renewable energy sources such as wind energy or solar energy are increasingly being used to generate energy. In order to guarantee a sustainable and stable energy supply based on renewable energy sources, it is necessary to store the energy gained and to release it again later. This requires cost-effective energy storage devices which can store excess energy temporarily and release it again with a time delay.

Document EP2147193B1 discloses on the one hand a device and a method for storing thermal energy. The document also discloses a device for the storage and time-delayed release of electrical energy. To charge the energy storage device, electrical energy is converted into heat and stored as thermal energy. When discharging, the thermal energy is converted back into electrical energy and then released. The disadvantages of this device or method are that it requires two separate energy storage units, a heat storage unit and a cold storage unit, which must also be operated at very high temperatures of up to 2000° C. and very low temperatures of down to −80° C., respectively, which means that the construction, operation and maintenance of the device, comprising, in addition to the heat or cold storage unit, compressors, heat exchangers, etc., is very complex and expensive. The required compressors are also relatively large and their power density low.

Document DE 10 2011 088380 A1 discloses an energy storage device for storing seasonal excess electrical energy. Energy storage is very long-term. The stored energy is stored in a steam circuit. This device is disadvantageous in terms of efficiency and cost.

PRESENTATION OF THE INVENTION

The problem of the present invention is therefore to form an economically more advantageous energy storage device or an economically more advantageous method for energy storage.

The problem of the present invention is in particular to form a more economically advantageous device or method for storing and recovering electrical energy.

This problem is solved with a device comprising the features of claim 1. The dependent claims 2 to 14 concern further advantageous embodiments. The problem is further solved with a method comprising the features of claim 15. The dependent claims 16 to 17 concern further, advantageous method steps.

The problem is in particular solved with an energy storage device for storing energy, comprising:

a high-temperature regenerator containing a solid, in particular porous, storage material,
a working gas as a heat transfer medium for exchanging heat between the storage material and the flowing working gas, and
a charging circuit and a discharging circuit for the working gas, the charging circuit being designed such that, starting from a preheater, at least a first heat exchange channel of a recuperator, a first compressor, the high-temperature regenerator, a second heat exchange channel of the recuperator, and then a first expander are conductively connected to one another to form a circuit so as to conduct fluid, and wherein the first compressor is coupled to the first expander, and wherein the first compressor forms
part of a first piston machine and the first expander forms part of a second piston machine, wherein the piston machines are controllably operable either as a compressor or as an expander such that the first compressor of the charging circuit in the discharging circuit forms a second expander, and in that the first expander of the charging circuit forms a second compressor in the discharging circuit, and wherein the high-temperature regenerator can be operatively and conductively connected to either the charging circuit or the discharging circuit such that the high-temperature regenerator, the compressor and the expander form either a part of the loading circuit or a part of the unloading circuit and the loading circuit, the unloading circuit and the high temperature regenerator have the same working gas so that the working gas comes into direct contact with the storage material of the high temperature regenerator both in the loading circuit and in the unloading circuit.

The problem is further solved in particular with a method for storing energy in an energy storage device, wherein the energy storage device comprises a high-temperature regenerator containing a solid, in particular porous storage material, wherein a working gas is heated and conveyed in a charging circuit by heating the working gas in a preheater and subsequently in a recuperator, in that the working gas is subsequently compressed and heated in a first compressor configured as a first piston machine and in that the working gas thus heated is subsequently supplied to the high temperature regenerator so that the working gas supplies heat to the storage material, and in that the working gas is subsequently cooled in the recuperator and is subsequently expanded in a first expander, which is designed as a second piston machine, wherein the first compressor being at least partially driven by the first expander, and wherein thermal energy being removed from the high-temperature regenerator via a discharging circuit, wherein the high-temperature regenerator switchably forms either a part of the charging circuit or a part of the discharging circuit, in that the high-temperature regenerator is connected in a fluid-conducting manner either to the charging circuit or to the discharging circuit, wherein the same working gas flows through the charging circuit, the discharging circuit and the high-temperature regenerator, so that the working gas flows directly around the storage material both in the charging circuit and in the discharging circuit.

The energy storage device according to the invention comprises a high-temperature regenerator containing a solid storage material, preferably a porous storage material, and a working gas as a heat transfer medium for exchanging heat between the working gas and the storage material via the working gas flowing along the storage material.

In heat exchangers, a distinction is made between a recuperator and a regenerator. In a recuperator, two fluids are conducted in mutually separated rooms, whereby heat is transferred between the rooms. In a recuperator, for example, two fluids are completely separated by a partition wall, whereby thermal energy is transferred between the two fluids via the common partition wall. A regenerator is a heat exchanger in which the heat is temporarily stored in a medium during the exchange process. In a regenerator, the storage material in a possible design is directly surrounded by working gas. When charging the regenerator, the heat energy supplied by the working gas is transferred to the storage material and stored in the storage material. When the regenerator is discharging, the working gas extracts heat energy from the storage material, cools the storage material, and the heat energy extracted from the working gas is fed to a subsequent process. In the regenerator, the working gas comes into direct contact with the storage material both during charging and discharging.

The advantage of the energy storage device according to the invention is that it requires only one energy storage device and, if necessary, an additional low-temperature heat storage device, preferably a hot water storage device. The low-temperature heat storage tank can also be dispensed with, for example by obtaining the required heat by cooling a component of the energy storage device, such as the compressor. The advantage of the energy storage device according to the invention is that the compressors and expanders are designed as piston machines. Piston machines, i.e. piston compressors and piston expanders, are reliable and cost-effective machines, so that the energy storage device according to the invention is reliable, low-maintenance and inexpensive to operate. In addition to the high-temperature regenerator, the energy storage device according to the invention also includes a charging circuit, a discharging circuit and switching means to connect the charging circuit for charging or the discharging circuit with the high-temperature regenerator for discharging. The charging circuit and the discharging circuit can be open in a possible design. Preferably, however, the charging circuit and the discharging circuit are designed as closed circuits. A solid material such as porous refractory bricks, sand, gravel, concrete, graphite or a ceramic, or a combination of these materials, is suitable as a storage material in the high-temperature regenerator. In addition, flow paths must be provided in the high-temperature regenerator and/or the storage material must be porous so that the working gas can flow along or through the storage material. The storage material can be heated to a temperature preferably in the range between 600-1000° C. and, if necessary, up to 1500° C. The charging circuit and the discharging circuit are advantageously designed as a closed circuit. This design has the advantage that the working gas can also have an overpressure, which increases the power density of the piston machines accordingly at higher pressure. In an advantageous design, an inert gas such as argon or nitrogen is used as the working gas. However, other gases are also suitable as working gases. For example, air can also be used as working gas in an open charging circuit and an open discharging circuit. The advantage of the energy storage device according to the invention is that it has a high energy density, so that the high-temperature generator can be relatively compact. In addition, the high-temperature regenerator can be manufactured cost-effectively, as the storage material is very inexpensive and environmentally friendly. The energy storage device according to the invention also has the advantage that the discharging circuit can be designed differently according to requirements. Advantageously, the discharging circuit drives a generator or other mechanical power consuming device to generate electrical or mechanical energy. However, it is also possible to extract heat from the discharging circuit in place of or in addition to electrical energy, for example process, industrial or heating heat.

In a particularly advantageous configuration, the energy storage device comprises an electric generator and, in a preferred configuration, also an electric motor, so that the energy storage device according to the invention can be charged with electrical energy and also can deliver electrical energy again when it is discharging. Such an energy storage device is also known as the Electricity Energy Storage System by means of Pumped Heat (ESSPH).

The energy storage device according to the invention comprising an electric generator and an electric motor is thus capable of converting electrical energy into thermal energy, storing the thermal energy and converting the stored thermal energy back into electrical energy. The energy storage device according to the invention can thus also be described as a "thermal battery", which can be charged by a charging process and discharged by a discharging process, whereby the charging process is carried out with the aid of a hot gas heat pump process with a piston machine and the discharging process is also carried out with the aid of the piston machine. Piston machines are used for compression and expansion, in particular linear moving piston machines or crosshead piston machines.

The invented energy storage device, or thermal battery, can be charged and discharged insofar in a similar way as an electric battery, as partial charging or partial discharging is possible at any time. The storage concept on which the inventive energy storage device is based allows the storage of capacities in the range of preferably between 1 kW and 10 MW and energy quantities in the range of preferably between a few kWh and 50 MWh and the time-delayed release of them by a corresponding design of the subcomponents. In a particularly advantageous embodiment, the electric generator and the electric motor are designed as a single machine in the form of a motor generator. The invented energy storage device is excellently suited to shift electrical energy in time, for example by 12 or 24 hours, for example in an electrical network to store solar energy produced during the day and to release it again at night. The invention-based energy storage device is also excellently suited for stabilizing the electrical grid, in particular for frequency stabilization. In an advantageous operating mode, the energy storage device is operated at a constant speed of rotation and is connected to the electrical grid.

In one possible configuration, the energy storage device in accordance with the invention comprises at least four piston machines, two piston machines being operated as piston compressors and two piston machines being operated as piston expanders, both the charging circuit and the discharging circuit comprising a piston compressor and a piston expander respectively.

In a particularly advantageous configuration, the energy storage device according to the invention comprises a first and a second piston machine, wherein the first piston machine can be operated reversibly as either a high-temperature compressor or a high-temperature expander, and wherein the second piston machine can be operated reversibly as either a low-temperature compressor or a low-temperature expander. The high-temperature regenerator and the two piston machines can be connected in such a way that they during charging are operating as a high-temperature compressor and a low-temperature expander in the charging circuit, and that they during discharging are operating as a low-temperature compressor and a high-temperature expander in the discharging circuit. This design has the advantage that the energy storage device can be operated with two piston machines and that preferably no compressors and expanders other than the two piston machines are required.

In a further particularly advantageous configuration, the first and second piston machines are integrated into a single piston machine, in that the single piston machine is designed as a double-acting piston machine by comprising one cylinder in which one double-acting piston is arranged, the double-acting piston dividing the cylinder into a first and a second interior space. Depending on the switching state, this single piston machine forms either the high-temperature compressor and the low-temperature expander or the high-temperature expander and the low-temperature compressor. In a particularly advantageous design, this single piston machine is driven by a linear drive, preferably by an electric linear drive, and particularly preferably by an electric linear drive which can also be used as an electric linear generator, so that electrical power or energy can be supplied or dissipated via the linear drive depending on the operating mode of the energy storage device. Such an energy storage device can be manufactured particularly cost-effectively and is particularly suitable for the storage of low electric power, for example in the range from 1 kW to 100 KW, or for the storage of small amounts of energy, for example in the range from 1 kWh to 500 kWh.

In the following, the invention is described in detail on the basis of execution examples.

SHORT DESCRIPTION OF THE DRAWINGS

Figure 2:
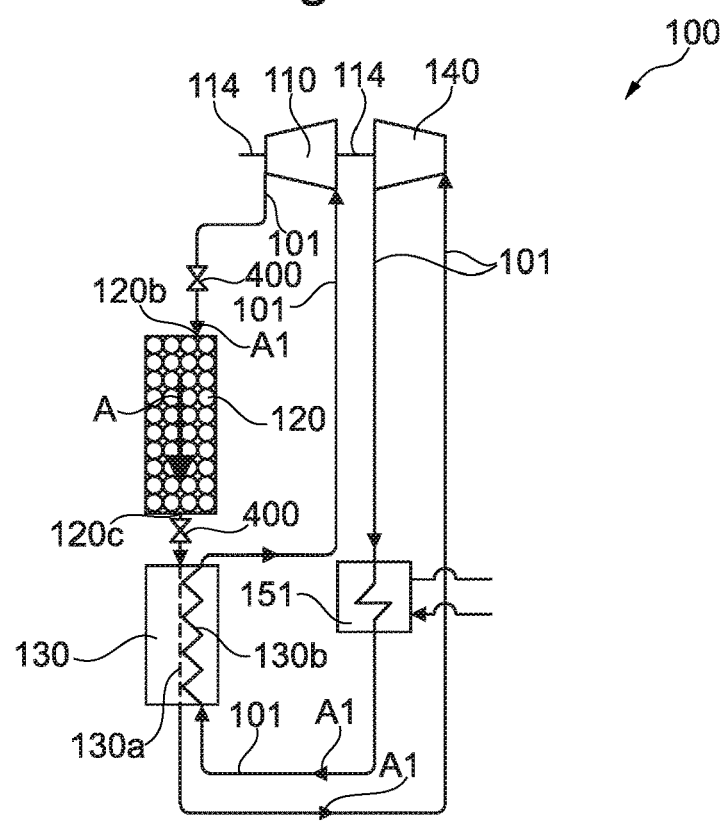
Figure 3:
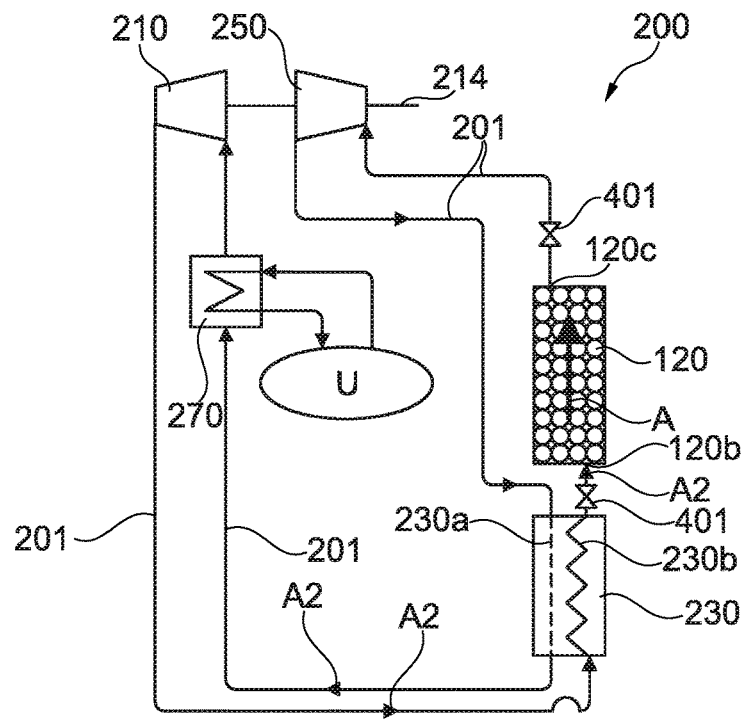
Figure 4:
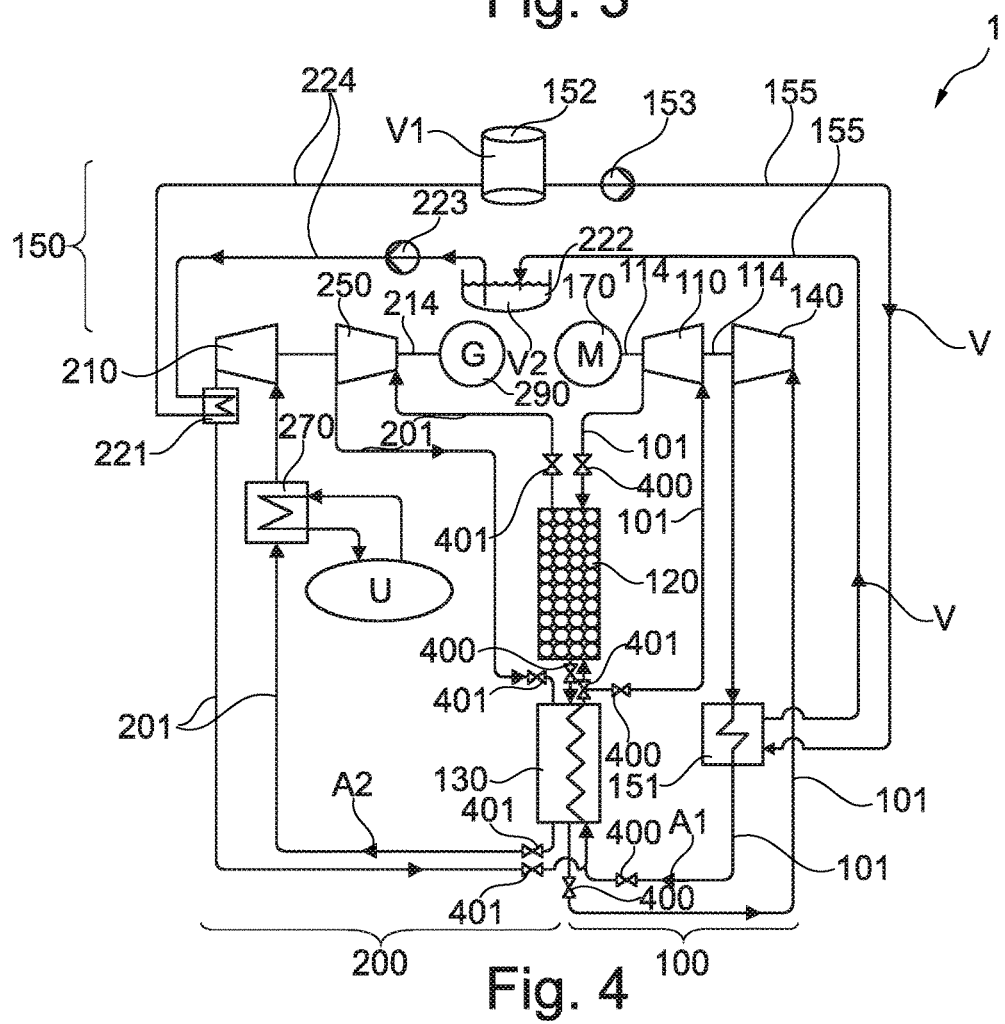
Figure 5:
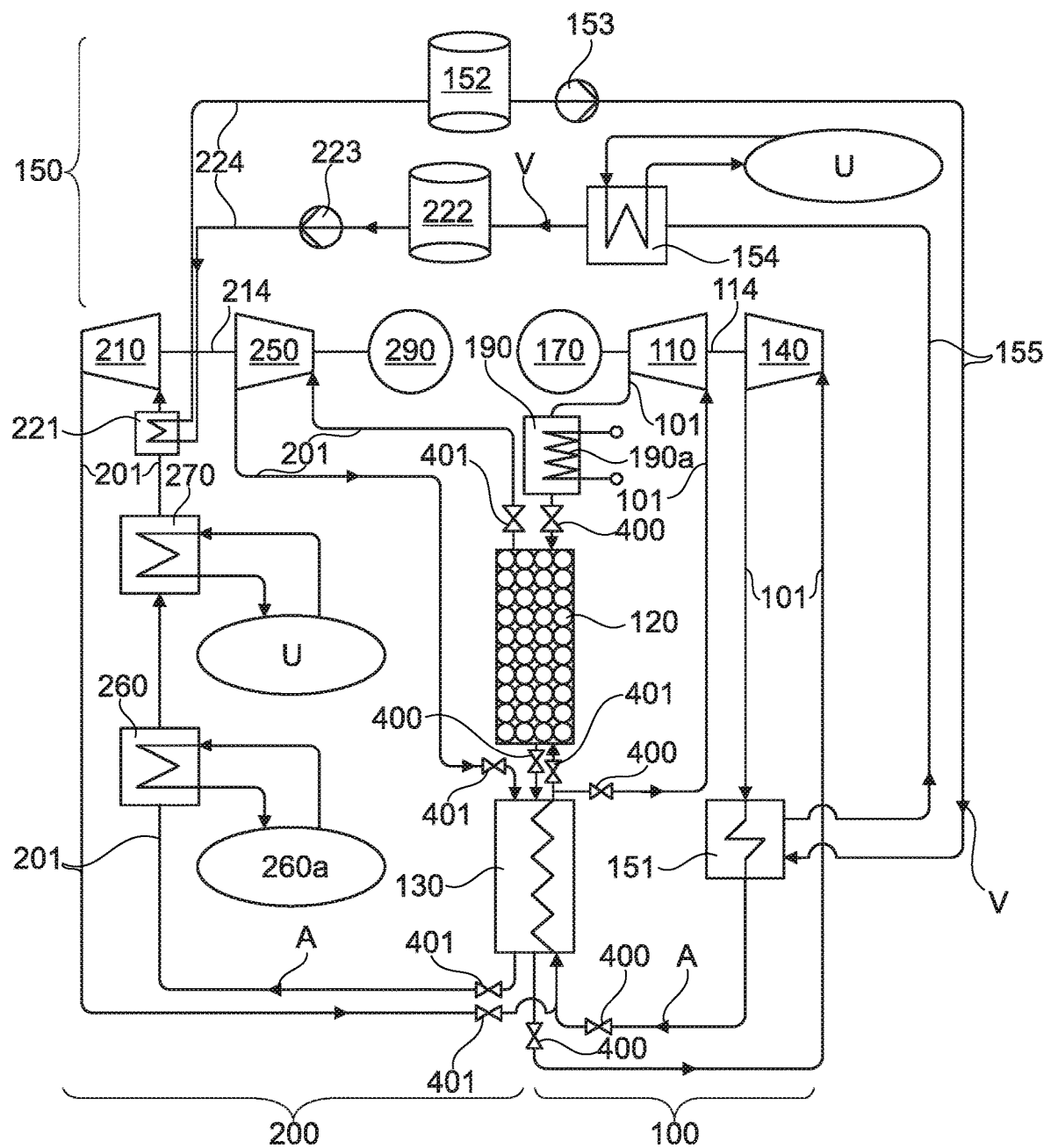
Figure 6:
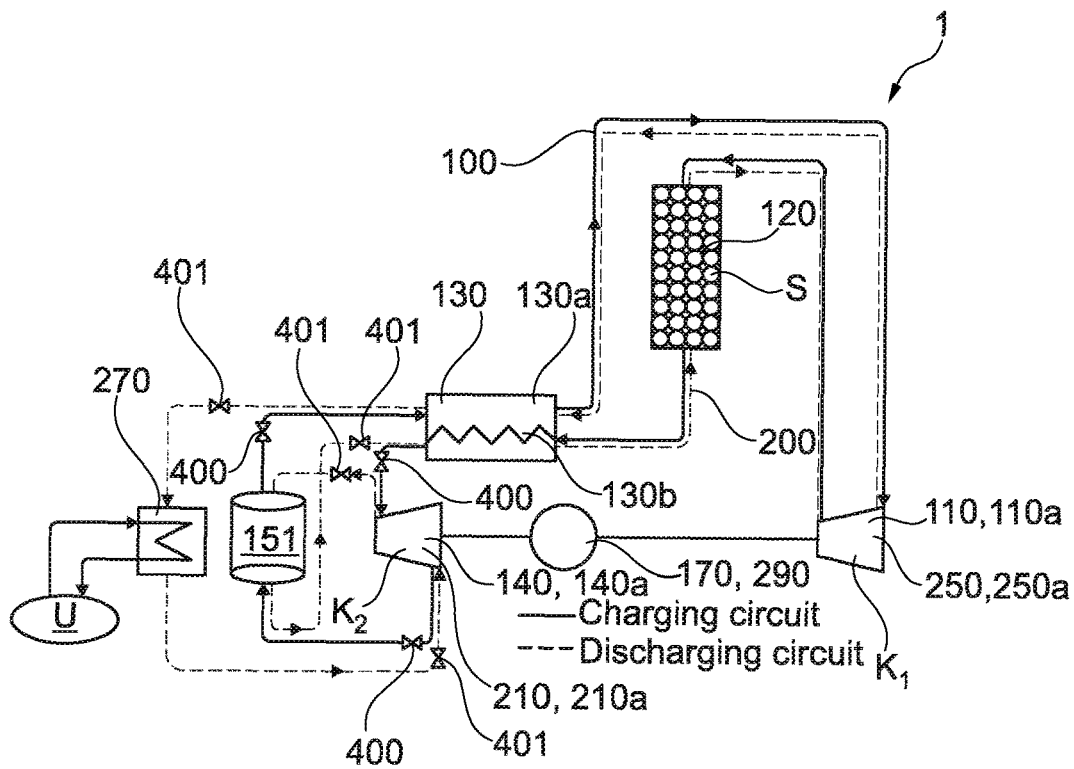
Figure 7:
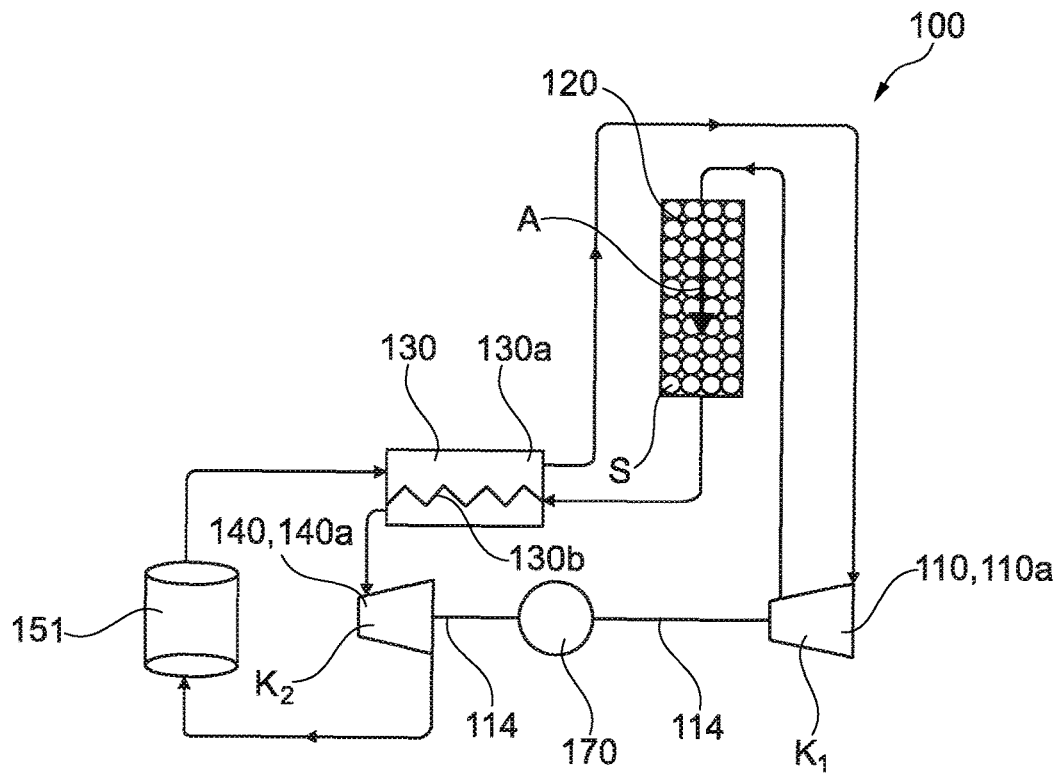
Figure 8:
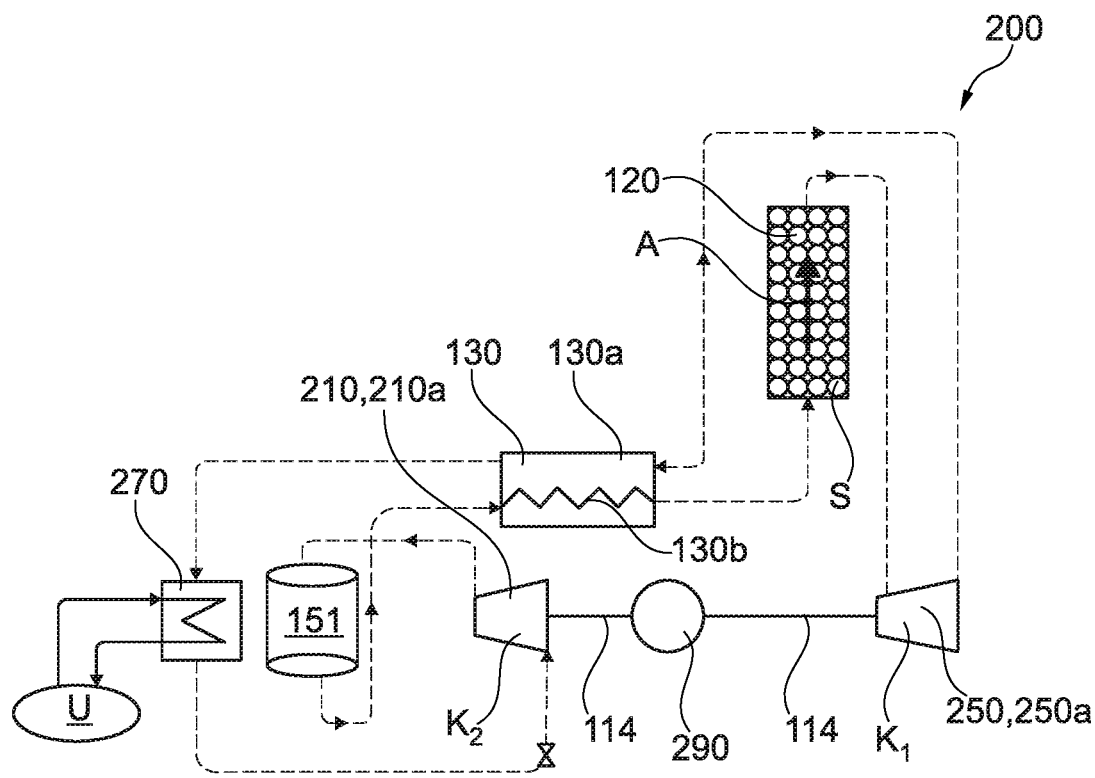
Figures 9A, 9B:
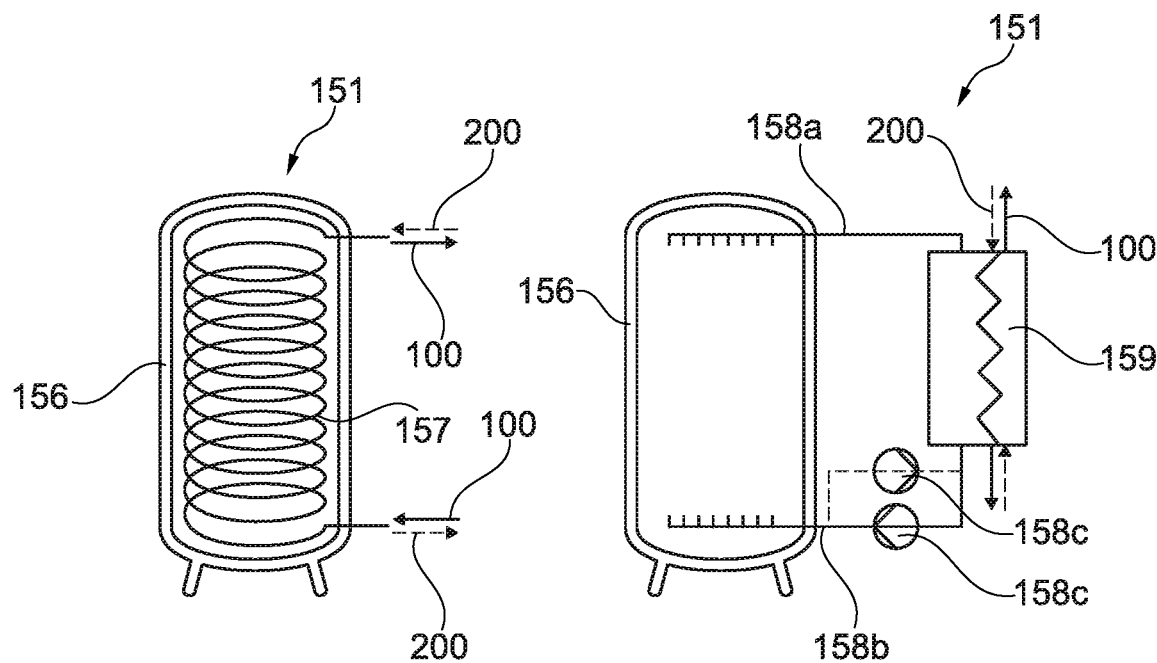
Figure 10:
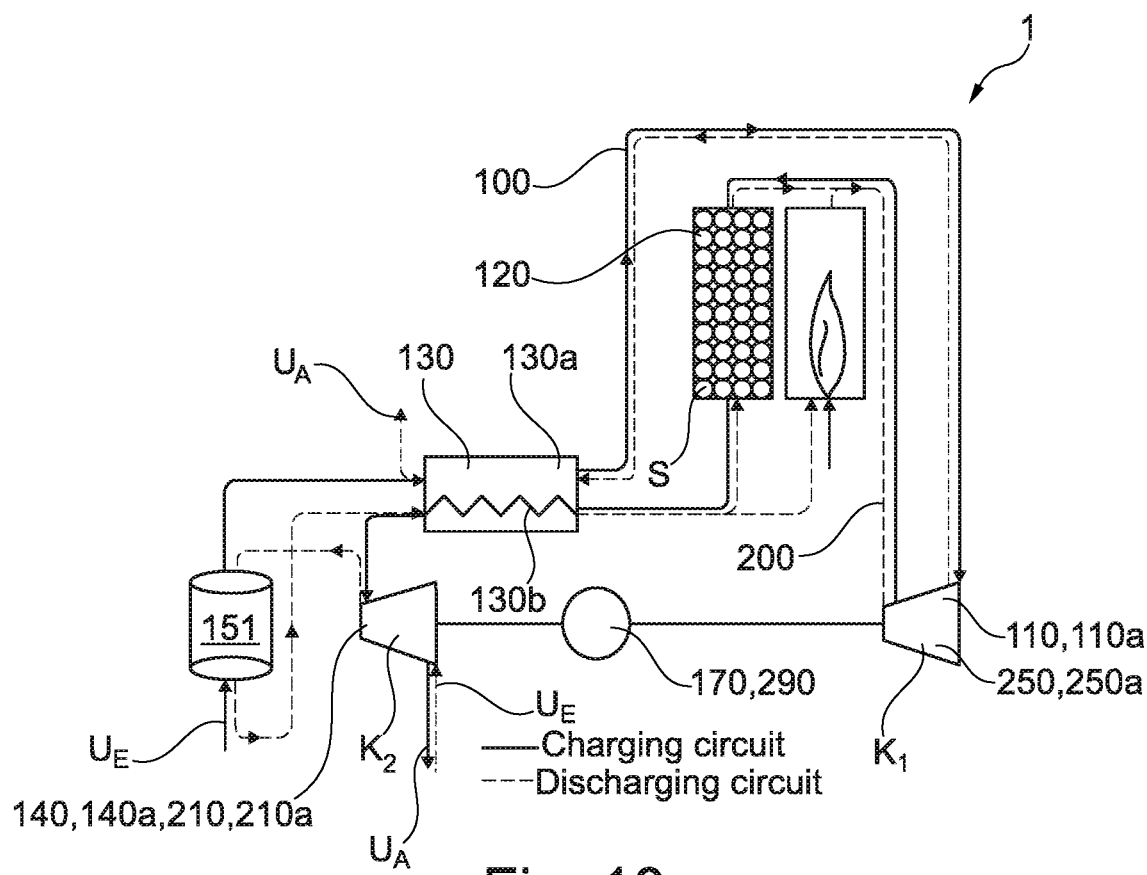
Figure 11:
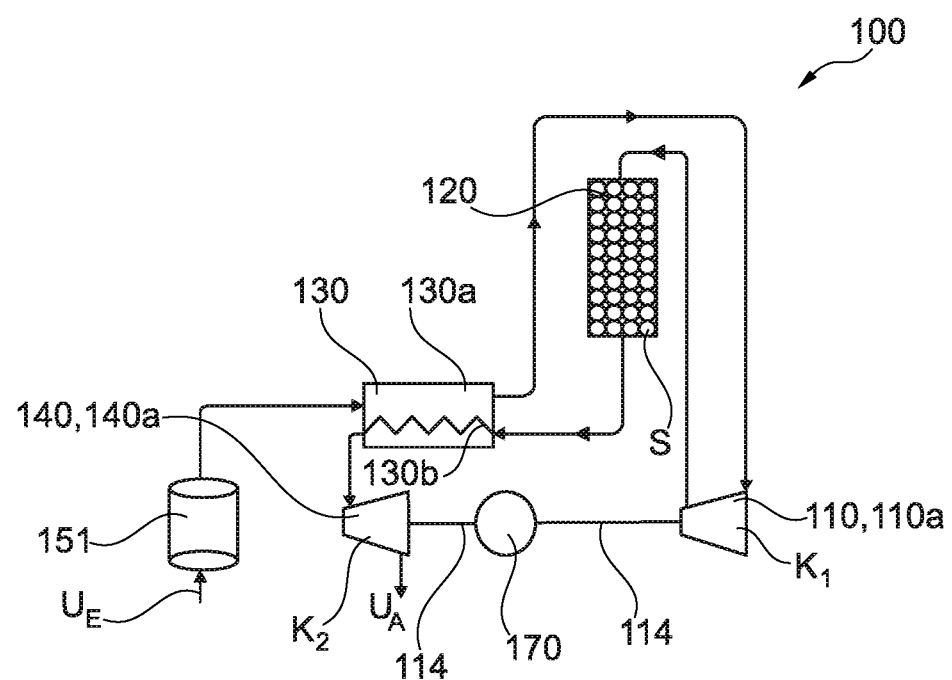
Figure 12:
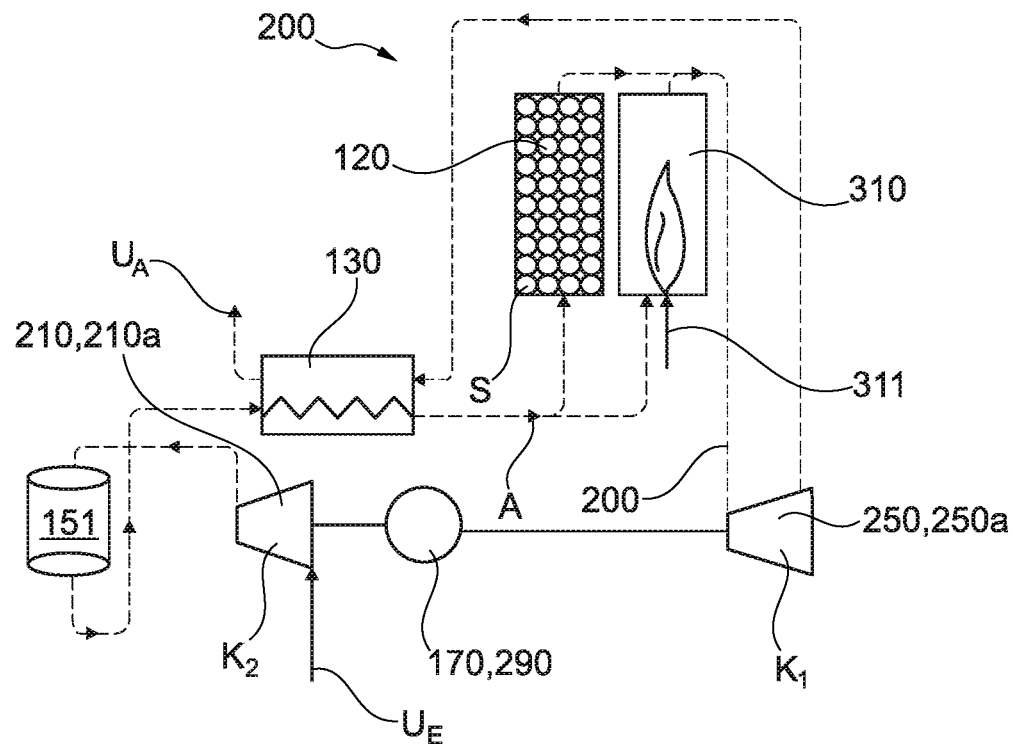
Figure 13:
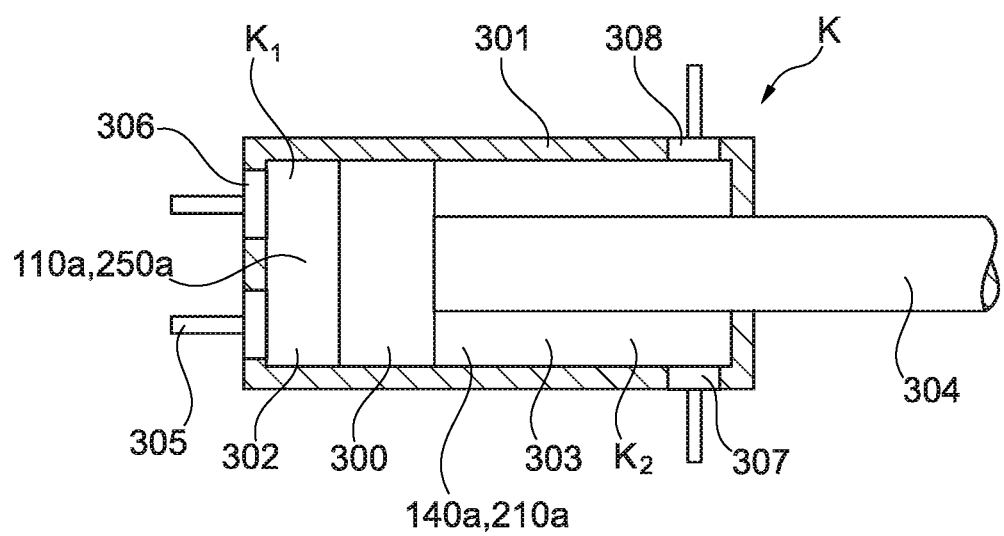
Figure 14:
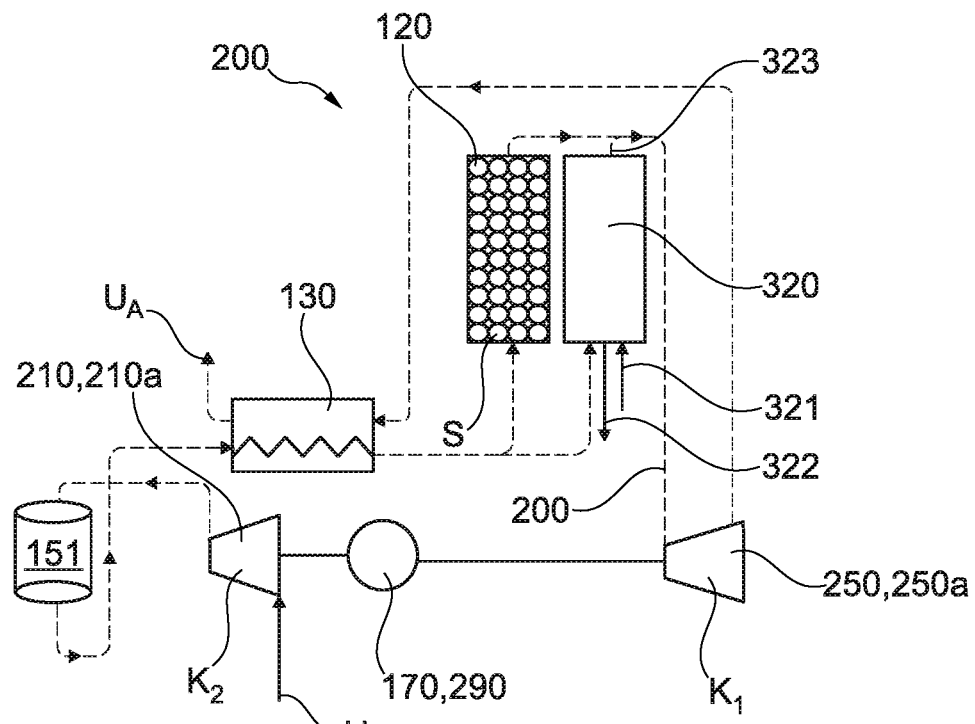
Figure 15:
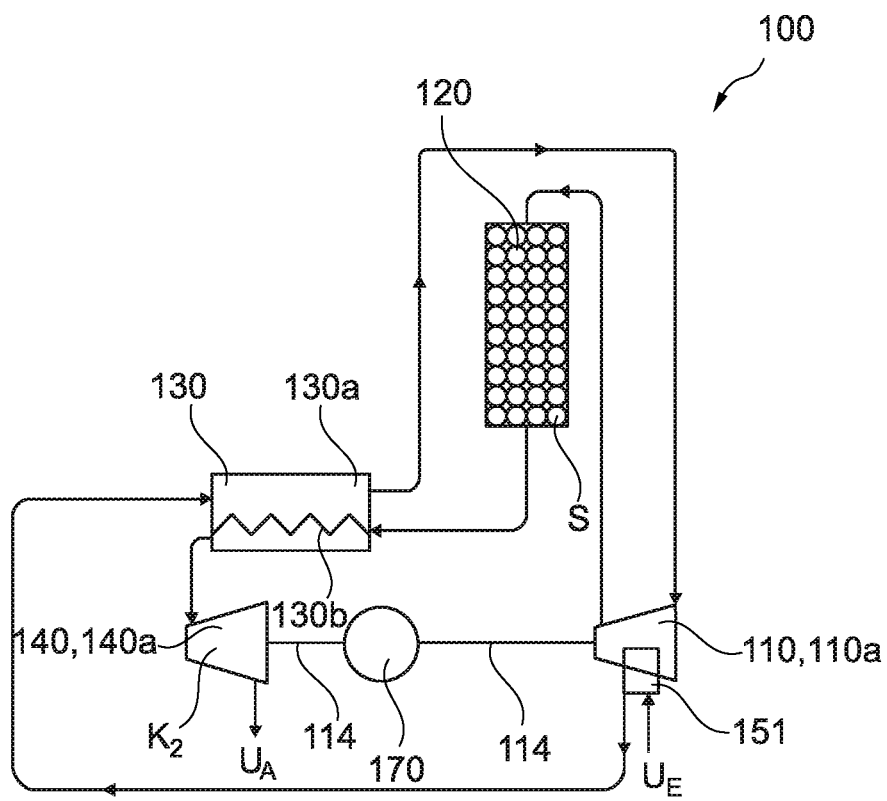
Figure 16:
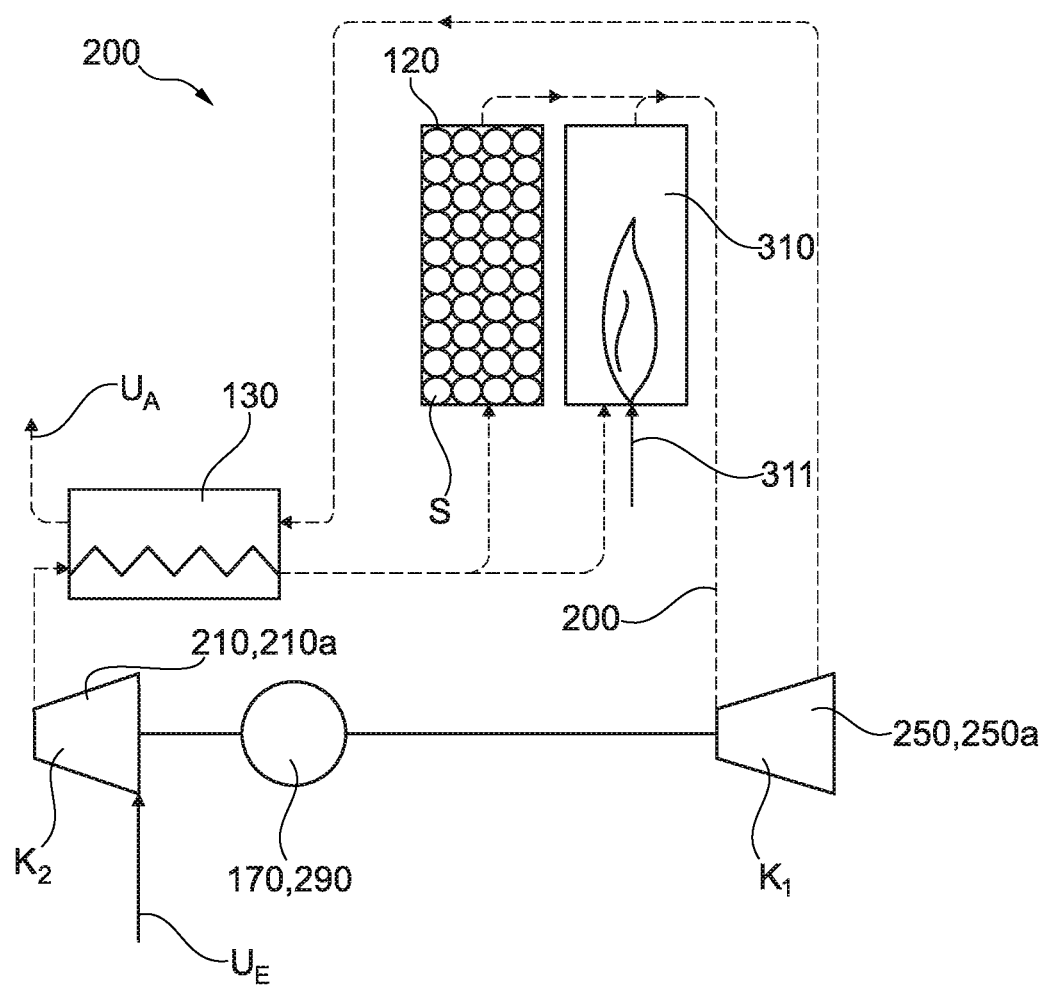

The drawings used to explain the execution examples are shown:

FIG. 1 a first embodiment of an energy storage device comprising a charging circuit and a discharging circuit;

FIG. 2 the charging circuit according to FIG. 1 in detail;

FIG. 3 the discharging circuit according to FIG. 1 in detail;

FIG. 4 a second embodiment of an energy storage device;

FIG. 5 a third embodiment of an energy storage device;

FIG. 6 a fourth embodiment of an energy storage device;

FIG. 7 the charging circuit according to FIG. 6 in detail;

FIG. 8 the unloading circuit according to FIG. 6 in detail;

FIG. 9a low temperature storage device;

FIG. 9b a further low temperature storage device;

FIG. 10 a fifth example of an energy storage device;

FIG. 11 an example of the charging circuit according to FIG. 10 in detail;

FIG. 12 the discharging circuit according to FIG. 10 in detail;

FIG. 13 schematically a longitudinal section through a double acting piston machine;

FIG. 14 a sixth example of an energy storage device;

FIG. 15 another example of a charging circuit in detail;

FIG. 16 another example of a discharging circuit in detail.

In general, the same parts in the drawings are provided with the same reference marks.

WAYS OF CARRYING OUT THE INVENTION

FIG. 1 shows an energy storage device 1 for storing thermal energy, comprising a closed charging circuit 100 with lines 101, a closed discharging circuit 200 with lines 201, a high temperature regenerator 120 and switching means 400, 401, the switching means 400, 401 being connected to the lines 101, 201 in such a way that the high temperature regenerator 120 can be conductively connected either to the charging circuit 100 or to the discharging circuit 200 so that the high temperature regenerator 120 forms part of the charging circuit 100 and part of the discharging circuit 200, respectively. A control device 500 is signal conductively connected to the switching means 400, 401 and other sensors and actuators not shown in detail in order to control the energy storage device 1. FIGS. 2 and 3 show the charging circuit 100 and discharging circuit 200 shown in FIG. 1 in detail. The high temperature regenerator 120 contains a solid storage material as well as a working gas A as heat transfer medium to exchange heat between the storage material and the flowing working gas A. Porous refractory materials, sand, gravel, rock, concrete, graphite or even ceramics such as silicon carbide are suitable as solid storage materials for the high-temperature regenerator. The high-temperature regenerator 120 comprises an outer shell 120a and an interior, wherein the solid storage material is arranged and/or designed in the interior in such a way that the working gas A can flow through or around the storage material for heat exchange. As shown in FIG. 2, the high-temperature regenerator 120 also comprises at least one inlet opening 120b and at least one outlet opening 120c to supply or discharge the working gas A flowing in the lines 101 or 201 to or from the interior of the high-temperature regenerator, so that the working gas A circulating in the charging circuit 100 or in the discharging circuit 200 comes into direct contact with the solid storage material. FIG. 1 shows a high-temperature regenerator 120 running or arranged in a vertical direction, whereby the working gas A flows advantageously from top to bottom during loading and from bottom to top during unloading.

FIG. 2 shows the closed charging circuit 100 shown in FIG. 1 in detail. The closed loading circuit 100 for working gas A comprises a first compressor 110, a first expander 140, a first recuperator 130 with a first and a second heat exchange channel 130a, 130b, the high-temperature regenerator 120 and a preheater 151, the first compressor 110 being coupled to the first expander 140 via a common shaft 114. The switching means 400 designed as valves are switched to flow and the switching means 401 not shown in FIG. 2 are blocked so that a closed charging circuit 100 is formed in which the working gas A flows in flow direction A1 or in charging flow direction A1. Working gas A is preferably argon or nitrogen. Working gas A is advantageously kept under overpressure in order to increase the power density of compressor 110 and expander 140 and to improve the heat transfer in the caloric apparatus. The pressure is preferably in a range from 1 to 20 bar. Starting from the high-temperature regenerator 120, the working gas A is supplied successively to at least the first heat exchange channel 130a of the recuperator 130, the first expander 140, the preheater 151, the second heat exchange channel 130b of the recuperator 130, the first compressor 110 and then again to the high-temperature regenerator 120, forming a closed fluid-conducting circuit. The first compressor 110, the first expander 140 and the first recuperator 130 a heat pump. The preheater 151 is the source of energy, which is then pumped to a higher temperature level by the heat pump and then stored in the regenerator. The working gas A preheated by the preheater 151 and the recuperator 130 is fed as input gas to the first compressor 110, where it is compressed, thus experiencing an increase in temperature and pressure. The compressed working gas A is fed to the high-temperature regenerator 120, cooled in it, then cooled further in the recuperator 130, and then expanded in the first expander 140, before being preheated again in the preheater 151 and the recuperator 130. The first Expander 140 and the compressor 110 are arranged on the same shaft 114, so that the first Expander 140 supports the driving of the first compressor 110. The shaft 114 is driven by an unrepresented driving device or machine, such as an electric motor, a turbine, or generally an engine.

A discharging circuit 200 is required to discharge the thermal energy stored in the high-temperature regenerator 120. This discharging circuit 200 can be designed in different ways depending on the demand for which the stored thermal energy is needed. FIG. 3 shows in detail the closed discharging circuit 200 shown in FIG. 1, which is equipped with piston machines. As working gas A the same gas is used as in loading circuit 100, preferably argon or nitrogen. The closed discharging circuit 200 for working gas A comprises a second compressor 210, a second expander 250, a second recuperator 230 with a first and a second heat exchange channel 230*a*, 230*b*, the high temperature regenerator 120 and a first cooler 270, the second compressor 210 being coupled to the second expander 250 via shaft 214. The switching means 401 designed as valves are switched to flow and the switching means 400 not shown in FIG. 3 are blocked so that a closed discharging circuit 200 is formed in which the working gas A flows in flow direction A2 respectively in discharge flow direction A2. The discharging circuit 200 is designed in such a way that, starting from the high-temperature regenerator 120, at least the second expander 250, the first heat exchange channel 230*a* of the second recuperator 230, the first cooler 270, the second compressor 210, the second heat exchange channel 230*b* of the recuperator 230, and thereafter the high-temperature regenerator 120 are conductively connected to one another to form the closed circuit, the working gas A flowing in the discharging circuit 200 in the flow direction A2 respectively in the discharge flow direction A2.

As shown in FIG. 3, the first cooler 270 is preferably cooled to ambient temperature U. As can be seen from FIGS. 2 and 3, the direction of discharge flow A2 in the high-temperature regenerator 120 flows in the opposite direction to the direction of charge flow A1. The working gas A flowing out of the high-temperature regenerator 120 is expanded via the second expander 250 and thus cooled and is then further cooled in the second recuperator 230 and in the first cooler 270, before the working gas A is compressed in the second compressor 210 and then preheated in the second recuperator 230, before flowing back into the high-temperature regenerator 120 again. The second compressor 210 and the second expander 250 are coupled together, and in the example shown they are connected to a shaft 214, so that the second expander 250 drives the second compressor 210. Energy is taken from shaft 214 by a not shown arrangement, e.g. a generator or a working machine can be connected to shaft 214.

In a possible configuration, the energy storage device 1 shown in FIGS. 1 to 3 comprises two piston compressors forming the first and second compressors 110, 210 and two piston expanders forming the first and second expanders 250. In a particularly advantageous configuration, the energy storage device 1 as shown in FIG. 1 comprises a first piston machine K1 and a second piston machine K2, wherein the first compressor 110 forms part of the first piston machine K1 and the first expander 140 forms part of the second piston machine (K2), wherein the piston machines K1, K2 are drivable either as compressors or as expanders such that the first piston machine K1 also forms part of the second expander 250 and the second piston machine K2 forms part of the second compressor 210. Two piston machines are therefore sufficient to operate the energy storage device 1 shown in FIG. 1.

FIG. 4 shows a further advantageous configuration of an energy storage device 1. In contrast to the energy storage device 1 with two separate recuperators 130 shown in FIGS. 1 to 3, the energy storage device 1 shown in FIG. 4 has a single common recuperator 130. Working gas A is controlled by means of switching means 400, 401 like valves in such a way that a charging circuit 100 or a discharging circuit 200 is created, similar to the charging circuit 100 or discharging circuit 200 shown in FIG. 2 or 3, with the exception that there is only one single common recuperator 130.

In a further, advantageous embodiment, the energy storage device 1, in addition to the charging circuit 100 and the discharging circuit 200, also includes a preheating system 150 for a circulating preheating fluid V. The preheating system 150 comprises in particular a first fluid reservoir 152, in which a heated preheating fluid V1 is stored, a second fluid reservoir 222, in which a cooled preheating fluid V2 is stored, and fluid lines 155, 224 and optionally conveying means 153, 223 for circulating the preheating fluid V in the preheating system 150 and supplying it in particular to the preheater 151 and the cooler 221. In the example shown, the preheating fluid V is fed to the preheater 151 from the first fluid reservoir 152, and the subsequently cooled preheating fluid V is fed to the second fluid reservoir 222. The cooled preheating fluid V of the second fluid reservoir 222 is fed to an aftercooler 221, and the subsequently heated preheating fluid V is fed to the first fluid reservoir 152. Water is preferably used as the preheating fluid V, as water has a high heat storage density. The second fluid reservoir 222 could be designed as a liquid tank so that the preheating system 150 forms a closed circuit. The second fluid reservoir 222 could also be open, whereby instead of a tank, a water body, for example a lake, would also be suitable for holding the cooled preheating fluid V or for providing cooling fluid V.

In an advantageous configuration, the energy storage device 1 is used to store electrical energy and to deliver electrical energy at staggered times. FIG. 4 shows such an electrical energy storage device comprising the energy storage device 1 and comprising an electric motor 170 and a generator 290. In a particularly advantageous configuration, the electric motor 170 and the generator 290 are combined into a single machine to form a so-called motor generator. The energy storage device 1 shown in FIG. 4 can therefore be manufactured at a particularly favorable price because only a single motor generator 170/290, a single high-temperature regenerator 120 and a single recuperator 130 are required.

Some details on the function of the advantageous energy storage device 1 shown in FIG. 4 are given below. The first compressor 110, the first expander 140, the first recuperator 130 form a heat pump in the charging circuit 100. The preheated working gas A is fed to the first compressor 110 and brought to the maximum pressure or temperature in the loading circuit 100. The working gas A is then passed through the high-temperature regenerator 120, cooled and then cooled again in the recuperator 130. The working gas A is then expanded in the first Expander 140 to the lowest pressure in the loading circuit 100, whereby the energy released in the first Expander 140 is used to partially drive the first compressor 110. The working gas A then flows through the preheater 151 and is preheated. The preheater 151 is connected to the preheating system 150 and draws the heat energy from the first fluid reservoir 152 for the warm preheating fluid, in the represented embodiment as warm water.

The discharging circuit 200 comprises a second compressor 210, designed as a piston compressor, and comprises the aftercooler 221, the recuperator 130, the high-temperature regenerator 120, the second expander 250 and the first cooler 270, which cools to ambient temperature U. The aftercooler 221 is connected to the preheating system 150 via lines 224, where cool fluid is taken from the storage tank 222, the conveying medium 223 is fed to the aftercooler 221, and the heated fluid is fed to the storage tank 152.

FIG. 5 shows another example of an energy storage device 1, which in turn comprises a charging circuit 100, a discharging circuit 200 and a preheating circuit 150. The energy storage device 1 as shown in FIG. 5 is similar in design to the energy storage device 1 as shown in FIG. 4, but differs at least in the following aspects:

The preheating circuit 150 is designed as a closed circuit comprising a closed tank 222, the fluid in the closed circuit preferably being water. In addition, a heat exchanger 221 is arranged in the preheating circuit 150, and a heat exchanger 154 is arranged, which exchanges heat with the environment U. Alternatively, the heat exchanger 154 can also be arranged between the cold water tank 222 and the conveyor 223. Alternatively, the heat exchanger 154 can also be arranged in the cold water storage tank 222 in order to exchange heat directly between the cold water storage tank 222 and the environment U or another medium. For example, the cold water tank 222 could be cooled at night by the heat exchanger 154.

The charging circuit 100 in an advantageous embodiment comprises a supplementary heater 190, which is located between the first compressor 110 and the high-temperature regenerator 120. The supplementary heater 190 is used to reheat the hot working gas A leaving the first compressor 110, for example from 750° C. to 1500° C., in order to increase the energy stored in the high-temperature regenerator 120. The supplementary heater 190 could, for example, contain an electric heater 190a to heat the working gas A flowing through. Depending on the temperature increase of the working gas A caused by the additional heater 190, the heat energy stored in the high-temperature regenerator 120 can be increased by a considerable factor, for example by a factor of 2.

The discharging circuit 200 comprises an additional cooler 260, through which 200 heat for a heating process 260a can be extracted from the discharging circuit. The heating process 260a, for example, could be a local heating network for heating houses.

FIG. 5 also shows switching means 400, 401 or valves which are required to switch between charging and discharging or between charging circuit 100 and discharging circuit 200 with the energy storage device 1 shown.

The energy storage device 1 shown in FIG. 5 has the advantage that, if desired, thermal energy can also be dissipated directly, and thermal energy can also be dissipated at different locations and at different temperatures. As shown in FIG. 5, the second fluid reservoir 222 can, for example, also be designed as a closed tank, with an additional heat exchanger 154 arranged in the preheat circuit 150, which exchanges heat with the environment.

In the embodiments shown in FIGS. 1 to 5, the charging circuit 100 and the discharging circuit 200 are advantageously operated pressurized. The first compressor 110 and the second compressor 210 are designed as piston compressors.

The first compressor 110 and the second compressor 210 are preferably equipped without a control device. However, the first and second compressors 110, 210 could also be equipped with a flow control device. Preferably the flow control device of the first compressor or second compressor 110, 210 consists of a lift-off gripper.

Preferably the first compressor 110 is uncooled. Optionally, the first compressor 110 can also be equipped with a cooling device.

The high-temperature regenerator 120 is advantageously a pressure-resistant, temperature-resistant, thermally insulated container. The high-temperature regenerator 120 is advantageously equipped with a porous, temperature-resistant heat storage material 121, whereby the working gas A flows in the free spaces of the high-temperature regenerator 120. It is advantageous that the high-temperature regenerator 120 is arranged vertically and is preferably flowed through from top to bottom during loading and from bottom to top during unloading.

The fluid in the preheating circuit 150 is preferably water. Optionally, other fluids such as a mixture of water and (mono-) ethylene glycol could also be used. The preheating circuit 150 is preferably operated without pressure. Optionally, the preheating circuit 150 can be operated pressurized. In this case, the preheating circuit 150 is pressure-resistant.

The drive 170 of the charging circuit 100 is preferably designed as an electric motor. A large number of power machines are suitable as drive 170. Optionally, the electric motor is equipped with a frequency converter. Optionally, the 170 drive of the charging circuit 100 is a steam turbine. Optionally, the drive 170 of the charging circuit 100 is a gas turbine. Optionally, the 170 drive of the charging circuit is a combustion engine. The rotating components of the charging circuit 100 are preferably operated at constant speed. Optionally, the rotating components of the charging circuit 100 can be operated at variable speeds.

The consumer 290 of the discharging circuit 200 is preferably designed as a generator. Optionally the generator is equipped with a frequency converter. Optionally, the consumer 290 of the discharging circuit 200 is a compressor. Optionally the consumer 290 of the discharging circuit 200 is a pump. Optionally, the consumer 290 of the unloading circuit 200 is a ship's propeller. The rotating components of the discharging circuit 200 are preferably operated at a constant speed. Optionally, the rotating components of the discharging circuit 200 can be operated at variable speeds.

In another possible design example, air could also be used as the working gas, whereby it must then be ensured that the storage material S in the high-temperature regenerator 120 consists of a non-combustible material.

FIG. 6 shows a fourth example of an energy storage device 1. FIG. 7 shows the closed charging circuit 100 as shown in FIG. 6 in detail and FIG. 8 shows the closed discharging circuit 200 as shown in FIG. 6 in detail. The energy storage device 1 for storing energy comprises a high-temperature regenerator 120 containing a solid, in particular porous, storage material S, a working gas A as heat transfer medium for exchanging heat between the storage material S and the flowing working gas A, and a charging circuit 100 as well as a discharging circuit 200 for the working gas A, the charging circuit 100 being designed such that, starting from a preheater 151 which is designed as a low-temperature heat accumulator, at least one first heat exchange channel 130a of a recuperator 130, a first compressor 110, the high-temperature regenerator 120, a second heat exchange channel 130b of the recuperator 130, and then a first expander 140 are conductively connected to one another to form a closed circuit fluid. The first compressor 110 is coupled to the first expander 140, preferably via a common shaft 114.

Advantageously, the common shaft 114 is also connected to an electric motor 170 or an electric generator 290. The first compressor 110 is part of a first piston machine K1 and the first expander 140 is part of a second piston machine K2. FIG. 8 shows the closed discharging circuit 200, comprising a second compressor 210 and a second expander 250. The piston machines K1, K2 are controllable in such a way that they can be operated either as compressors or as expanders, that the first compressor 110 of the charge circuit 100 in the discharging circuit 200 forms a second expander 250, and that the first expander 140 of the charge circuit 100 in the discharging circuit 200 forms a second compressor 210. The high-temperature regenerator 120 can be controlled by means of the switching means 400, 401, shown in FIG. 6 only, in such a way that it can be connected either to the charging circuit 100 or to the discharging circuit 200 in a conductive manner, that the high-temperature regenerator 120, the recuperator 130, the compressor as well as the expander form either a part of the charging circuit 100 or a part of the discharging circuit 200. The loading circuit 100, the unloading circuit 200 and the high-temperature regenerator 120 have the same working gas A, so that working gas A comes into direct contact with the storage material of the high-temperature regenerator 120 both in the loading circuit 100 and in the unloading circuit 200.

As shown in FIG. 6 the first piston machine K1 is switchable either as a high temperature compressor 110a or as a high temperature expander 250a. The second piston machine K2 can be operated either as a low-temperature compressor 210a or as a low-temperature expander 140a. In the charging circuit 100, the first compressor 110 is designed as high temperature compressor 110a, and the first expander 140 is designed as low temperature expander 140a. In the discharging circuit 200, the second compressor 210 is a low temperature compressor 210a and the second expander 250 is a high temperature expander 250a. Two piston machines are therefore sufficient to operate the energy storage device shown in FIG. 6. Of course, additional piston machines can also be used, for example by operating piston machines in parallel to increase performance, for example by operating two first piston machines K1 and two second piston machines K2 in parallel. The piston machines connected in parallel are preferably operated identically. Advantageously, as shown in FIGS. 6 to 8, the first piston machine K1 is directly upstream or directly downstream of the high-temperature regenerator 120 depending on the direction of flow of the working gas A, so that the first piston machine K1 can also be referred to as the hot-gas machine, i.e. the working gas A conveyed in the first piston machine K1 has a high temperature, which is why the first compressor 110 or the second expander 250 of the first piston machine K1 are also referred to as the high-temperature compressor 110a or the high-temperature expander 250a. In the second piston machine K2, the working gas A produced has a relatively low temperature, for example ambient temperature, which is why the second piston machine K2 is also referred to as the cold gas machine, which is why the second compressor 210 and the first expander 140 of the second piston machine K2 are also referred to as the low-temperature compressor 210a and the low-temperature expander 140a respectively.

FIG. 9a shows an embodiment of a preheater 151 designed as a low-temperature storage tank comprising a water tank 156 filled with water and a heat exchange pipe 157 running in the water. The preheater 151 can be connected to either the charging circuit 100 or the discharging circuit 200 by means of switching means such as those shown in FIG. 6. FIG. 9b shows another example of a preheater 151 designed as a low-temperature storage tank comprising a water tank 156 filled with water, and inlet and outlet pipes 158a, 158b connected to a heat exchanger 159 via pumps 158c, 158a and 158b. The heat exchanger 159 can be connected to either the charging circuit 100 or the discharging circuit 200 with the aid of switching means, such as those shown in FIG. 6.

FIG. 10 shows a fifth example of an energy storage device 1 having an open charging circuit 100 and an open discharging circuit 200. FIG. 11 shows the open charging circuit 100. In contrast to the closed charging circuit shown in FIG. 7, the open charging circuit shown in FIG. 11 has an input $U_E$ from the environment and an output $U_A$ to the environment, so that preferably ambient air $U_E$ is supplied to the preheater 151, and the air is released again as fluid flow $U_A$ to the environment after flowing through the charging circuit 100 after the first expander 140. Alternatively, the preheater 151 can also obtain heat from another heat source, for example by placing it in the high-temperature compressor 110a, as shown in FIG. 15, which must be cooled due to high temperatures, so that the preheater 151 also acts as a cooler. In this case, preheating is ensured by cooling the high-temperature compressor. This also applies to the closed variant from FIG. 6. In the charging circuit 100 as shown in FIG. 7, the preheater 151, as shown in FIG. 15, could be designed as a cooler of the high temperature compressor 110a, so that the output of the closed circuit after the first expander 140 would be fed to the preheater 151 located in the high temperature compressor 110a, and the preheater 151 would then be connected to the recuperator 130. FIG. 12 shows an example of an open discharging circuit 200 comprising a high temperature regenerator 120 and a combustion chamber 310 connected in parallel. A fuel 311 can be supplied to the combustion chamber 310 in a controllable way. The ambient air $U_E$ is supplied to the compressor 210, and after the recuperator 130 is controllably supplied either to the high-temperature regenerator 120 and/or the combustion chamber 310. This energy storage device 1 has the advantage that a fuel can also be burned with the same device in order to generate energy from it, in particular electrical energy. A variety of fuels are suitable as fuel, such as hydrogen, hydrocarbons such as natural gas, methane or crude oil, or fuels that are produced during waste recycling, such as biogas. The invented energy storage device is thus also able to use fuels or to generate electrical energy from fuels. The gas leaving the combustion chamber 310 is a mixture of ambient air and combustion gases. FIG. 10 shows a combination of the cycles shown in FIGS. 11 and 12.

FIG. 13 shows an example of a double-acting piston machine K in which the first and second piston machines K1 and K2 are combined to form a single piston machine K. The single piston machine K comprises a double-acting piston 300 which forms in a cylinder 301 a first and a second interior 302, 303, such that the first interior 302 forms part of the high temperature compressor 110a and the second interior 303 forms part of the low temperature expander 140a, or vice versa, such that the first interior 302 forms part of the high temperature expander 250a and the second interior 303 forms part of the low temperature compressor 210a. Inlet valves 305, 307 and outlet valves 306, 308 are also provided to allow fluid exchange with the first interior 302 or the second interior 303 and the charge circuit 100 or the discharging circuit 200. If piston machines with valves were used, the external switching means 400, 401 shown in FIGS. 1 and 5, for example, would become superfluous. A piston rod 304 that moves linearly in its direction is connected to the piston 300. The piston rod 304 is connected to an machine and a working machine. In a particularly advantageous design, the power engine and the driven machine are designed as electric linear motors or linear generators, so that the double-acting piston machine K can be driven by the linear motor via a linear movement, and the double-acting piston machine K generates electrical power via the linear generator. It is advantageous that the high temperature compressor 110a or the high temperature expander 250a, as shown in FIG. 13, has a larger volume than the low temperature compressor 210a or the low temperature expander 140a, in particular because the hot gas occupies a larger volume. Advantageously, the double-acting piston machine K is operated oil-free or at least an oil-free seal is used for the piston 300 in order to avoid contamination of the loading circuit 100 and the unloading circuit 200 with oil. In an advantageous configuration, the inlet valves 305, 307 and/or the outlet valves 306, 308 are controlled, in particular to control the amount of working gas A conveyed and to switch the device from the charging process to the discharging process.

FIG. 14 shows a discharging circuit 200 of a sixth design example of an energy storage device 1. In contrast to the discharging circuit 200 shown in FIG. 12, in the discharging circuit 200 shown in FIG. 14 the combustion chamber 310 shown in FIG. 12 is replaced by a fuel cell 320 shown only schematically or a fuel cell system comprising the fuel cell 320 shown only schematically. A SOFC fuel cell (Solid Oxide Fuel Cell) is particularly suitable as a fuel cell 320. The fuel cell 320 is supplied in a manner known per se on the one hand with at least a part of the heated ambient air $U_E$ in the discharging circuit 200 and on the other hand with a fuel 322, for example hydrogen, methane or biogas. The exhaust gases 323 of the fuel cell 320 are fed into the discharging circuit 200. In addition, the electrical energy 322 generated by the fuel cell 320 is dissipated.

The discharging circuit 200 shown in FIG. 14 is advantageously combined with the charging circuit 100 shown in FIG. 11 to form an energy storage device 1 similar to the energy storage device 1 shown in FIG. 10, except that the combustion chamber 310 is replaced by the fuel cell 320 and a fuel cell system comprising the fuel cell 320, respectively. Such an arrangement has a higher overall efficiency than the energy storage device 1 as shown in FIG. 10 comprising the combustion chamber 310. An energy storage device 1 comprising the discharging circuit 200 as shown in FIG. 14 may have an electrical efficiency of e.g. more than 70% in the conversion of hydrogen, methane or other suitable fuels into electricity. Different types of fuel cells are suitable, whereby an SOFC fuel cell is particularly suitable, as it has operating temperatures of approximately 1000° C., which is advantageous.

FIG. 16 shows another discharging circuit 200 which does not include a preheater 151 but is otherwise identical to the discharging circuit 200 shown in FIG. 12. The charging circuit 100 shown in FIG. 15 and the discharging circuit 200 shown in FIG. 16 are preferably combined to form an energy storage device 1 as shown in FIG. 10, except that the preheater 151 is arranged in the first compressor 110 and cools it so that the final charging circuit 200 as shown in FIG. 16 does not in itself require a preheater 151.

The closed energy storage device 1 shown in FIGS. 6 to 8 could also be modified so that the preheater 151, as shown in FIG. 15, draws heat from the compressor 110 by cooling it so that in FIG. 7 the preheater 151 would be located at the compressor 110. With such a design, the preheater 151 could be dispensed with in discharging circuit 200 as shown in FIG. 8, so that the second compressor 210 would be connected directly to the recuperator 130.

The invention claimed is:

1. An Energy storage device for storing energy, comprising:
a high-temperature regenerator containing a solid storage material (S),
a working gas (A) as heat transfer medium to transfer heat between the storage material (S) and the working gas (A), and
a charging circuit and a discharging circuit for the working gas (A), the charging circuit being designed such that, starting from a preheater, at least a first heat exchange channel of a recuperator, a first compressor, the high-temperature regenerator, a second heat exchange channel of the recuperator and then a first expander are conductively connected to one another to form a circuit so as to conduct fluid, and wherein the first compressor is coupled to the first expander, and wherein the first compressor forms part of a first piston machine (K1) and the first expander forms part of a second piston machine (K2), wherein the piston machines (K1, K2) are controllably operable either as a compressor or as an expander such that the first compressor of the charging circuit forms a second expander in the discharging circuit, and in that the first expander of the charging circuit forms a second compressor in the discharging circuit, and wherein the high-temperature regenerator can be operatively connected to either the charging circuit or the discharging circuit such that the high-temperature regenerator, the first piston machine and the second piston machine form either a part of the charging circuit or a part of the discharging circuit, and wherein the charging circuit, the discharging circuit and the high temperature regenerator have the same working gas (A) so that the working gas (A) comes into direct contact with the storage material of the high temperature regenerator both in the charging circuit and in the discharging circuit.

2. The Energy storage device according to claim 1, wherein the charging circuit is designed as a closed charging circuit, and in that the discharging circuit is designed as a closed discharging circuit.

3. The Energy storage device according to claim 2, wherein the discharging circuit comprises the second compressor, the second expander, the recuperator, the high-temperature regenerator the preheater and a cooler wherein the discharging circuit being formed in such a way, in that at least the second expander, the first heat exchange channel of the recuperator, the cooler the second compressor, the preheater, the second heat exchange channel of the recuperator, and then the high-temperature regenerator are conductively connected to one another starting from the high-temperature regenerator to form the closed circuit.

4. The Energy storage device according to claim 1, wherein the first piston machine (K1) can be operated switchably either as a high-temperature compressor or as a high-temperature expander, in that the second piston machine (K2) can be operated switchably either as a low-temperature compressor or as a low-temperature expander, in that, in the charging circuit, the first compressor is configured as a high-temperature compressor and the first expander is configured as a low-temperature expander, and in that, in the discharging circuit, the second compressor is configured as a low-temperature compressor and the second expander is configured as a high-temperature expander.

5. The Energy storage device according to claim 4, wherein the first piston machine (K1) is directly upstream or directly downstream of the high-temperature regenerator depending on the flow direction of the working gas (A).

6. The Energy storage device according to claim 1, wherein the first piston machine (K1) and the second piston machine (K2) are coupled to a motor machine and/or to a working machine, the motor machine preferably being designed as an electric motor and the working machine preferably as an electric generator.

7. The Energy storage device according to claim 1, wherein the storage material (S) of the high-temperature regenerator comprises at least one of the following materials: porous material, sand, gravel, rock, concrete, graphite, ceramics such as silicon carbide.

8. The Energy storage device according to claim 1, wherein the first and second piston machines (K1, K2) are formed by at least two separate piston machines (K1, K2) or by a single piston machine comprising at least two pistons.

9. The Energy storage device according to claim 1, wherein the first and second piston machines (K1, K2) are formed by a single piston machine (K), the single piston machine (K) comprising a double-acting piston which has in a cylinder a first and a second interior space such that the first interior forms part of the high temperature compressor and the second interior (303) forms part of the low temperature expander, or vice versa, that the first interior forms part of the high temperature expander and the second interior forms part of the low temperature compressor.

10. The Energy storage device according to claim 4, wherein the high temperature compressor or the high temperature expander has a larger volume than the low temperature compressor or the low temperature expander, respectively.

11. The Energy storage device according to claim 1, wherein a combustion chamber is connected in the discharging circuit in parallel with the high-temperature regenerator, so that the working gas (A) in the discharging circuit can be heated alternatively or additionally by a fuel supplied to the combustion chamber.

12. The Energy storage device according to claim 1, wherein a fuel cell is connected in the discharging circuit in parallel with the high-temperature regenerator, wherein part of the working gas (A) being fed to the fuel cell and wherein the exhaust gases from the fuel cell being fed to the discharging circuit.

13. An energy storage device according to claim 1, wherein the preheater comprises a fluid reservoir.

14. The Energy storage device according to claim 1, wherein the preheater is designed as a cooling device of the first compressor.

15. A method for storing energy in an energy storage device comprising a high-temperature regenerator containing a solid storage material (S), wherein a working gas (A) is heated and conveyed in a charging circuit by heating the working gas (A) in a preheater and subsequently in a recuperator, in that the working gas (A) is subsequently compressed and heated in a first compressor configured as a first piston machine (K1), and in that the working gas (A) thus heated is subsequently supplied to the high-temperature regenerator so that the working gas (A) supplies heat to the storage material (S), and in that the working gas (A) is subsequently cooled in the recuperator and is subsequently expanded in a first expander, which is designed as a second piston machine (K2), wherein the first compressor is at least partially driven by the first expander, and wherein thermal energy is taken from the high-temperature regenerator via a discharging circuit, wherein the high-temperature regenerator switchably forms either a part of the charging circuit or a part of the discharging circuit, in that the high-temperature regenerator switches fluid conductively either into the charging circuit or into the discharging circuit, wherein the charging circuit, the discharging circuit and the high-temperature regenerator being flowed through by the same working gas (A), so that the working gas (A) flows directly around the storage material both in the charging circuit and in the discharging circuit.

16. The method according to claim 15, wherein the charging circuit and the discharging circuit are operated as closed circuits.

17. The method according to claim 15, wherein the first piston machine (K1) is operated switchably either as a high-temperature compressor or as a high-temperature expander, in that the second piston machine (K2) is operated switchably either as a low-temperature compressor or as a low-temperature expander, and in that the high-temperature regenerator and the piston machines (K1, K2) are controllably connected to the charging circuit and the discharging circuit, respectively, in such a way that the charging circuit comprises the high-temperature compressor and the low-temperature expander, and in that the discharging circuit comprises the low-temperature compressor and the high-temperature expander.

18. A use of an energy storage device according to claim 1, for storing electrical energy and for the time-shifted release of electrical energy.

* * * * *